Sept. 3, 1935.                H. J. PARDEE                2,013,577
                           SEWAGE CHLORINATION
                          Filed Jan. 30, 1932

Inventor
HOWARD J. PARDEE,
By A. Pomack
Attorney

Patented Sept. 3, 1935

2,013,577

UNITED STATES PATENT OFFICE 2,013,577

SEWAGE CHLORINATION

Howard J. Pardee, New York, N. Y.

Application January 30, 1932, Serial No. 589,914

12 Claims. (Cl. 210—28)

The present invention relates to a novel and improved method of contacting chlorine with sewage or other liquids and to novel and improved means for carrying out such method.

Two methods of introducing chlorine to sewage and the like are in general use. The first and simplest is to dispose a diffusor in the sewage and to introduce the chlorine gas through this diffusor. The gas bubbles coming from the diffusor are dissolved by the sewage as they rise from the diffusor toward the top. It has never been practical to arrange these diffusors to introduce the chlorine uniformly throughout the flow of sewage. The result has been that the sewage coming into contact with the rising stream of bubbles has been heavily chlorinated, and this particular portion of the sewage has reacted with the chlorine. Especially in this type of reaction, the laws of mass action hold. These reactions take place much more rapidly with increase of chlorine concentrations. This results in that the sewage around the rising stream of bubbles reacts with a relatively very great amount of chlorine in a very short time. By the time this overtreated sewage has carried the chlorine into the rest of the sewage, sufficient active chlorine does not remain to cause proper sterilization, or else excessive amounts of chlorine must be introduced to take care of the active reaction where the chlorine is concentrated.

The second method of application has been to dissolve the chlorine in a stream of water and introduce this solution of chlorine into the sewage. From the viewpoint of efficiency, this method has had an advantage over the direct method in that the chlorine enters the sewage at a lower concentration and the rate of chlorine reaction is therefore less than with the direct method. This provides a longer period of time for sterilization, which, obviously, must be effected before the chlorine reacts to form compounds of no sterilizing value. However, here also, the concentrated chlorine solution combines with part of the sewage first and the chlorine content is greatly depleted before it reaches all the sewage.

Recent experience has taught that some form of agitation is desirable in sewage application in order to obtain an immediate mingling of the chlorine with the whole volume of sewage. As a result, use has been made in this connection of devices such as mechanical propellers and the like.

Most of the methods of agitation heretofore employed require outside power of some kind, such as water supply, electric current, etc., which are often expensive to obtain at sewage treatment works, which are often isolated. Attempts to use the flow of the sewage itself for the agitation have been handicapped by the great difference in rate of flow. If obstructions such as baffles, etc., are put in to give sufficient agitation at the low flows, the loss of head at high flows becomes excessive. Although several such arrangements have been suggested, none have proved to be of particular practical success.

In addition, the actual getting of the chlorine into the sewage is a problem. If it is put in directly with diffusors, as at first explained, the reaction in the film surrounding the bubble results in gas from the sewage, dissolved therein or liberated from the reaction, coming out into the bubble so that the bubble of chlorine eventually becomes a small bubble of other gas or gases retaining an appreciable amount of the original chlorine. The gases liberated in the formation of this bubble are not very soluble in sewage, the dilution of the chlorine that is left reducing its solubility. This resulting bubble of gas will go to the surface and escape to the atmosphere with an appreciable amount of chlorine still undissolved. The escape of this chlorine to the atmosphere becomes a nuisance if its amount is enough. In practice it is found that the direct introduction of chlorine can usually amount to quantities of about ten pounds per day without having an obnoxious amount of chlorine escaping. But as the quantity required increases above ten pounds per day the escaped chlorine gases become a nuisance in the vicinity and cause rapid deterioration of the equipment at the sewage works. The direct application of chlorine in quantities over ten pounds per day has generally been abandoned.

The general practice has been to completely dissolve the chlorine in a solution of water. When this solution is introduced into the sewage a certain amount of the gas is evolved but since the chlorine is already in solution only a very small amount is picked up by this evolving gas and carried off.

With the solution method, only a faint odor of chlorine is noticed at the treatment plant. On the other hand, the cost of laying water pipe to the sewage plant is often very considerable and since the chlorine solution in practice cannot be more than 0.25 per cent and usually considerably less chlorine, considerable water is used. In fact, at many plants where this water must be paid for, the cost of the water exceeds the cost of the chlorine.

The primary purpose of the present invention is the provision of a novel and efficient method and means of introducing chlorine into sewage and the like without loss to the atmosphere, without the use of auxiliary water, and without the use of auxiliary power for agitation, and at the same time obtain agitation which gives an immediate and instantaneous mixing of the chlorine throughout the whole body of the sewage so as to obtain the maximum efficiency of sterilization, thereby overcoming the several deficiencies of the methods above outlined while retaining or improving on their several advantages.

To this end, the invention contemplates a device which consists essentially of a gas tight chamber above the sewage. In this chamber, a weir or crest is provided over which the sewage flows forming a cataract on the downstream side. This cataract catches the gas in a chamber and carries it down into the sewage with it, breaking most of it into small bubbles which are readily dissolved, and causing agitation which sweeps these bubbles into contact with the whole body of the sewage.

Large bubbles which do not readily dissolve come to the surface and escape into the gas space where their content can again be caught by the cataract to be dissolved.

Several exemplary embodiments of the invention, the novel combination and relationship of the elements of which are fully described in some detail hereinafter and particularly pointed out in the claims hereunto appended, are illustrated on the accompanying drawing, in which Fig. 1 is a sectional view through one form of the invention;

Similar reference characters designate corresponding parts throughout the several figures of drawing.

Figure 1:
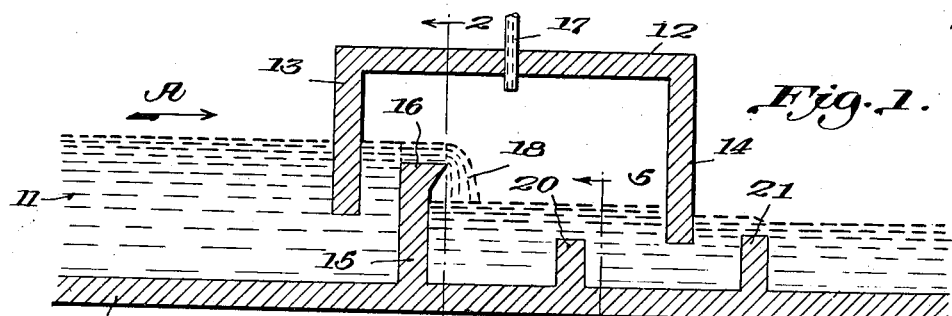

Referring first to the form of construction illustrated in Fig. 1 of the drawing, reference numeral 10 indicates the bottom of a sewage tank effluent trough or the like, to which the present invention is applied. The sewage containing fluid is indicated generally at 11, the direction of flow thereof being shown by the several arrows A.

A chlorine contact chamber, constructed in accordance with the principles of this invention, is disposed at any convenient point along the said bottom 10. This contact chamber may preferably be essentially defined by a dome 12, the walls 13 and 14 of which extend downwardly into the sewage, terminating in spaced relation to the bottom 10, and constituting inlet and outlet seals, respectively, for the said contact chamber.

Adjacent the inlet opening 13, but spaced therefrom in the manner illustrated on the drawing, bottom 10 is provided with an upstanding weir or crest-forming member 15, the upper end of which is slightly widened as at 16.

The chlorine is introduced to the chamber at any convenient point above the high sewage level. Reference numeral 17 designates a silver chlorine inlet tube which may preferably be sealed into the concrete, of which the contact chamber is constructed, with an asphalt compound. The inlet tube 17 is connected, by suitable means, to a conventional type of chlorine control unit (not illustrated).

As is clear from Fig. 1 of the drawing, sewage entering the contact chamber flows over the weir or crest 15, 16 forming a cataract 18 on the downstream side. This falling cataract catches the chlorine which has been introduced into the contact chamber and carries it along down into the sewage. Most of the chlorine thus entrapped is broken up into small bubbles which are readily dissolved. The falling cataract causes an agitation at the point of application of the chlorine which sweeps these bubbles effectively into contact with the whole body of the sewage. Large bubbles which may not readily dissolve rise in the sewage and escape back into the gas space above the sewage in the contact chamber where the content thereof may again be caught by the falling cataract and dissolved.

Figure 2:
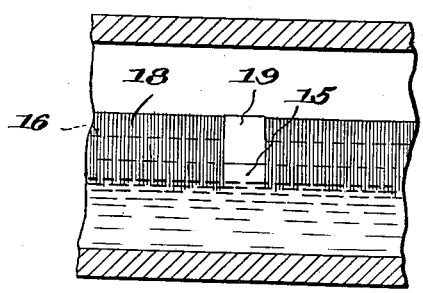
Fig. 2 is a front view of a portion of weir or crest, showing one form of means for breaking the continuity of the sheet of fluid flowing thereover.

Both sides of the falling cataract 18 are made effective for catching the chlorine and carrying it into the sewage for solution by causing one or more breaks in the sheet coming over crest 16, so that the chlorine in the contact chamber has free access behind the wall of fluid and thus utilizes both sides of the descending curtain. This break may conveniently be effected by providing one or more upstanding lugs or the like 19 (Fig. 2) on the top of weir 15, 16.

If the dome 12 is short, the chlorine contact chamber may preferably be provided, downstream of the weir, with a baffle member 20, the function of which is to deflect the general flow of the stream of fluid at that point upwardly toward the surface. This insures against large bubbles of gas being carried along the bottom 10 and through the outlet before they have time to rise to the surface. A further baffle member 21 may be provided just beyond the outlet from the contact chamber to insure sealing of this outlet.

With the construction heretofore described, it has been found that for a flow rate of one million gallons per day a length of crest of five feet is sufficient to take care of high dosages of chlorine (up to 100 R. P. M.). This length may be increased, if deemed expedient. The fall used is only six inches, making the device very economical of head. This six inch head will take care of any chlorine dosage which is needed.

Just as with the introduction of chlorine into sewage with any other method, considerable quantities of gas may be evolved. A considerable amount of this gas rises in the dome 12. It has one very beneficial effect in that when the chlorine feed is turned off and the chlorine content of the dome 12 dissolves in the sewage, there is always enough of this gas present to break any partial vacuum formed and to prevent the sewage from being drawn back into the connecting tube 17 or into the chlorine control equipment itself.

Where chlorine has been introduced directly through a diffusor, great trouble has been experienced because of this drawback. In some cases, the sewage has gone back to the control equipment and caused corrosion which has destroyed it. In more frequent instances, it has drawn back only into the diffusor and the tubing but has succeeded in plugging the small openings of the diffusor and causing both trouble and expense, as well as interruption of treatment.

Figure 3:
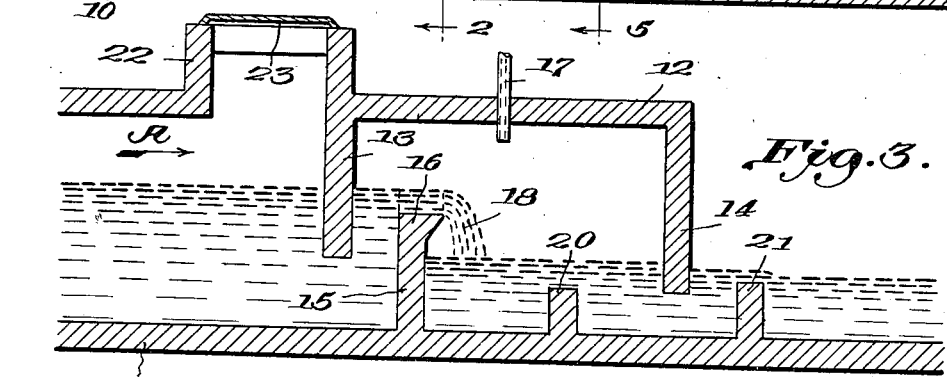
Fig. 3 is a sectional view through a modified form of construction.
Figures 5, 6:
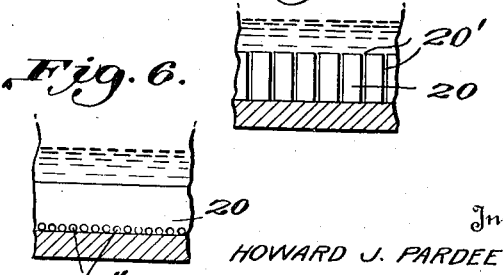
Figs. 5 and 6 illustrate different forms of bubble deflecting baffles.

This gas however will accumulate and increase in volume until it pushes out underneath the discharge seal, unless the baffle 20 is so constructed and arranged that the smaller bubbles of gas are not deflected to the surface but are carried out of the contactor. These small bubbles have all their chlorine washed out by the time they reach the surface outside the chamber. To this end, baffle 20 may preferably not be formed as a continuous member, but may instead consist of a plurality of closely adjacent baffle elements 20' (Fig. 5); or the baffle 20 may be provided along the bottom thereof with a series or plurality of series of closely adjacent perforations 20'' (Fig. 6). The size of the spaces between the baffle elements 20' and of the perforations 20'' is regulated by the size of the bubbles which it is desired to deflect upwardly and those which it is not desired to deflect.

Where the device is used to treat raw sewage or materials which contain floating particles, it is necessary to dispose an auxiliary chamber 22 (Fig. 3) having a manhole 23 in the top thereof, just ahead of the device, where this floating material can collect and from which it may be skimmed off before so much accumulates as interferes with the flow of sewage. In all other respects, the modification illustrated in Fig. 3 of the drawing is like that of Fig. 1.

Figure 4:
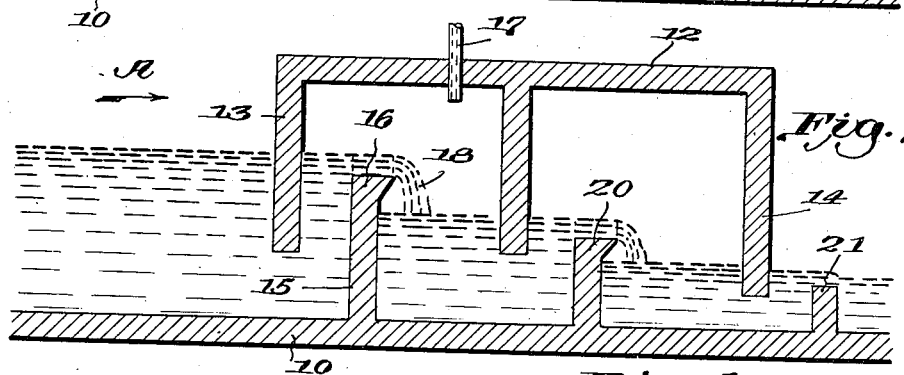
Fig. 4 is a sectional view through a further modification of the invention.

In the form of construction shown in Fig. 4, which is particularly adapted for use with high chlorine dosages where large quantities of gas are evolved, two chambers 12 with cataracts are connected in series. Chlorine is introduced into the first chamber in which approximately ninety-nine per cent of it may be washed out. Sufficient chlorine will be carried out under the discharge seal, however, with the gas liberated to cause an odor nuisance if it were allowed to escape into the atmosphere. This gas comes up into the second contact chamber 12 where the amount of chlorine is so reduced by the second washing that the gas discharge from the second chamber will not contain enough chlorine to be detected.

Although several exemplary embodiments of the invention have been described in some detail, it is not intended to limit the scope of the invention thereby, nor otherwise than by the terms of the claims hereunto appended. For instance, although the invention, in the modification illustrated in Fig. 4, does not utilize baffles 20, such baffles may nevertheless be used with this form of the invention, if deemed desirable. Other similar changes may be made without departing from the spirit of the invention.

What is claimed is:

1. In combination with a stream of sewage and the like, a hood disposed thereover and having the walls thereof extending partially into said stream, means for introducing chlorine into said hood above said sewage, and means enclosed by said hood for exposing the whole body of the sewage to the sterilizing action of the chlorine before the latter reacts to form compounds of no sterilizing value, said means comprising a weir over which the sewage is adapted to flow to form a gas-entraining cataract on the downstream side and a baffle member disposed downstream of said weir and adapted to deflect the general flow of the stream at that point upwardly toward the chlorine supply.

2. Means for introducing chlorine into sewage comprising a gas tight chlorine contact chamber through which the sewage is adapted to flow, means for causing said sewage to descend within said chamber in the form of a substantially vertical curtain, means for feeding chlorine to said chamber between the latter and said curtain, and means for exposing both sides of said curtain to said chlorine.

3. In a gastight sewage chlorinating chamber, a stream of sewage flowing therethrough, a supply of chlorine in said chamber above said stream, means for entrapping said chlorine in the said sewage in the form of bubbles, and means for deflecting the larger of said bubbles back into said supply space before they leave said chamber while permitting passage of the smaller bubbles, said means comprising a baffle, said baffle being discontinuous adjacent the bottom of said stream.

4. A multi-chambered sewage chlorinating contactor comprising sewage-cataract forming means within one chamber of said contactor, means for applying chlorine to both sides of said cataract, and means in another chamber for washing the reaction products free from chlorine before they escape from the contactor.

5. A sewage chlorinator comprising a pair of contacting chambers arranged in series, means to feed chlorine to the first of said chambers, and a cataract-forming weir in each of said chambers, the second of said chambers receiving a supply of chlorine solely from said first chamber.

6. In a sewage stream chlorinator, in combination, a downwardly-opening hood having the walls thereof extending partially into the sewage stream, means for introducing chlorine into said hood above said stream, and means enclosed by said hood for exposing substantially the whole body of the sewage to the sterilizing action of the chlorine before the latter reacts to form products of no sterilizing value, said hood-enclosed means comprising a plurality of weirs of different height over which the sewage flows successively to form gas-entraining cataracts.

7. In a sewage chlorinating system, an enclosed contact chamber through which a stream of sewage is adapted to flow, said chamber being provided with an inlet for chlorine gas, means in said chamber for effecting intimate contact between said sewage and said chlorine, a second enclosed chamber for collecting chlorine gas escaping from said first chamber, means for introducing liquid into said second chamber for substantially absorbing said collected chlorine gas, and means in said second chamber for effecting intimate contact between the liquid and gas therein.

8. The system defined in claim 7, said first-named means comprising a weir over which said sewage is adapted to flow to form a chlorine-entraining cataract.

9. The system defined in claim 7, said last-named means comprising a weir over which said sewage is adapted to flow to form a chlorine-entraining cataract.

10. The system defined in claim 7, each of said first-named and last-named means comprising a weir over which said sewage is adapted to flow to form a chlorine-entraining cataract.

11. In a system for contacting gas with a flowing body of liquid, a fluid-sealed contact chamber through which said body flows, means for creating an atmosphere of said gas in said chamber therebetween and said body, and means for causing a plurality of spaced columns of said liquid to descend through said atmosphere, said columns being exposed to said gas on all sides whereby they entrain said gas, break it up into bubbles and entrain the resultant bubbles into the flowing body of liquid and also simultaneously effect agitation of the latter adjacent the point of introduction of said bubbles thereinto, whereby intimate admixture of said liquid and gas is assured.

12. In a sewage chlorinating system, an enclosed contact chamber, means for creating a chlorine gas atmosphere in said chamber, means for passing a column of sewage through said atmosphere, whereby intimate and rapid contact between said sewage and chlorine is effected, a second enclosed chamber for collecting free chlorine gas escaping from said first chamber, whereby a chlorine-containing atmosphere is created in said second chamber, and means for passing a column of sewage through the atmosphere of said second chamber.

HOWARD J. PARDEE.